United States Patent
Driessen

(10) Patent No.: US 10,407,090 B2
(45) Date of Patent: Sep. 10, 2019

(54) DEVICE FOR TRANSPORTING A CHILD, AND CHILD SEAT

(71) Applicant: Mutsy B.V., Goirle (NL)

(72) Inventor: Franciscus Johannes Cornelius Driessen, Goirle (NL)

(73) Assignee: Mutsy B.V., Goirle (NL)

(*) Notice: Subject to any disclaimer, the term of this patent is extended or adjusted under 35 U.S.C. 154(b) by 0 days.

(21) Appl. No.: 16/085,448

(22) PCT Filed: Mar. 14, 2017

(86) PCT No.: PCT/NL2017/050159
§ 371 (c)(1),
(2) Date: Sep. 14, 2018

(87) PCT Pub. No.: WO2017/160144
PCT Pub. Date: Sep. 21, 2017

(65) Prior Publication Data
US 2019/0118848 A1    Apr. 25, 2019

(30) Foreign Application Priority Data

Mar. 17, 2016 (NL) .................................... 2016451

(51) Int. Cl.
*B62B 9/10* (2006.01)
(52) U.S. Cl.
CPC .................................. *B62B 9/104* (2013.01)
(58) Field of Classification Search
CPC ............ B62B 9/10; B62B 9/102; B62B 9/104
See application file for complete search history.

(56) References Cited

U.S. PATENT DOCUMENTS

| | | | | |
|---|---|---|---|---|
| 4,353,577 A | * | 10/1982 | Giordani | B62B 7/08 280/42 |
| 5,167,425 A | * | 12/1992 | Chen | B62B 7/12 280/47.4 |
| 5,393,122 A | * | 2/1995 | Andrisin, III | B60N 2/2848 280/47.38 |
| 5,490,685 A | * | 2/1996 | Kitayama | B62B 9/104 24/579.09 |

(Continued)

FOREIGN PATENT DOCUMENTS

| | | | |
|---|---|---|---|
| CN | 104908796 A | 9/2015 | |
| GB | 2178306 A | * 2/1987 | ............ B62B 9/104 |
| WO | 2014040726 A1 | 3/2014 | |

OTHER PUBLICATIONS

Jul. 25, 2017—International Search Report and Written Opinion of PCT/NL2017/050159.

*Primary Examiner* — Jacob B Meyer
(74) *Attorney, Agent, or Firm* — Banner & Witcoff, Ltd.

(57) ABSTRACT

A device for transporting a child with an adjustable child seat. The device comprises a tensioning device comprising a first band which is coupled to the seat part and a pair of substantially inelastic bands which are each connected at a first end to the first band and connected at a second end to respective sides of the frame. The device also comprises an adjusting device with which the pair of inelastic bands can be fixed relative to the back part. The first band is an elastic band which, at least after termination of the fixation of the pair of inelastic bands, exerts a tensile force on the inelastic bands, whereby these bands are tightened.

15 Claims, 5 Drawing Sheets

(56) References Cited

U.S. PATENT DOCUMENTS

| | | | | |
|---|---|---|---|---|
| 5,738,410 A * | 4/1998 | Stroud | B62B 7/08 | 297/354.12 |
| 5,749,627 A * | 5/1998 | Perego | B62B 9/104 | 280/647 |
| 5,752,738 A * | 5/1998 | Onishi | B62B 7/08 | 280/642 |
| 5,974,636 A * | 11/1999 | Brown | A44B 11/266 | 24/615 |
| 6,471,222 B1 * | 10/2002 | Hsia | B62B 7/123 | 280/47.4 |
| 6,908,100 B2 * | 6/2005 | Kassai | B62B 5/0023 | 280/642 |
| 6,938,914 B2 * | 9/2005 | Kassai | B62B 7/08 | 280/642 |
| 7,128,326 B2 * | 10/2006 | Chen | B62B 9/104 | 280/47.4 |
| 7,182,363 B2 * | 2/2007 | Takubo | B62B 7/123 | 280/47.38 |
| 7,278,652 B2 * | 10/2007 | Riedl | B62B 7/08 | 280/47.38 |
| 7,284,797 B2 * | 10/2007 | Huang | A44B 11/06 | 24/170 |
| 7,445,230 B2 * | 11/2008 | Kassai | B62B 7/123 | 280/644 |
| 7,832,744 B2 * | 11/2010 | Chen | B62B 7/123 | 280/47.4 |
| 8,113,523 B2 * | 2/2012 | Mountz | B62B 9/104 | 280/47.38 |
| 8,172,322 B2 * | 5/2012 | Chen | B62B 7/123 | 297/250.1 |
| 8,348,340 B2 * | 1/2013 | Ohnishi | A47D 1/002 | 297/256.13 |
| 9,102,348 B2 * | 8/2015 | Miller | A47D 1/002 | |
| 9,193,374 B2 * | 11/2015 | Dorca | B62B 9/102 | |
| 2002/0158434 A1 * | 10/2002 | Hsia | B62B 7/123 | 280/47.4 |
| 2003/0052474 A1 * | 3/2003 | Yang | B62B 9/104 | 280/642 |
| 2004/0061312 A1 * | 4/2004 | Kassai | B62B 7/08 | 280/643 |
| 2004/0140648 A1 * | 7/2004 | Takubo | B62B 7/123 | 280/642 |
| 2006/0001241 A1 * | 1/2006 | Chen | B62B 9/104 | 280/642 |
| 2006/0006629 A1 * | 1/2006 | Riedl | B62B 7/08 | 280/642 |
| 2006/0214490 A1 * | 9/2006 | Huang | A44B 11/06 | 297/354.1 |
| 2007/0102980 A1 * | 5/2007 | Chen | A44B 11/14 | 297/354.12 |
| 2009/0014986 A1 * | 1/2009 | Chen | B62B 7/123 | 280/658 |
| 2010/0244527 A1 * | 9/2010 | Chen | B62B 7/123 | 297/354.12 |
| 2013/0119736 A1 * | 5/2013 | Miller | A47D 1/002 | 297/354.12 |
| 2013/0328356 A1 * | 12/2013 | Dorca | B62B 9/104 | 297/94 |
| 2015/0145304 A1 * | 5/2015 | Yao | B62B 9/104 | 297/354.12 |
| 2018/0162437 A1 * | 6/2018 | Mostert | B62B 7/123 | |

* cited by examiner

DEVICE FOR TRANSPORTING A CHILD, AND CHILD SEAT

This application is a U.S. National Phase Entry of International Application No. PCT/NL2017/050159 filed on Mar. 14, 2017, designating the United States of America. The present application claims priority to and the benefit of the above-identified application and the above-identified application is incorporated by reference herein in its entirety.

FIELD

The present invention relates to a device for transporting a child. The present invention relates more particularly to such a device which is provided with an adjustable child seat.

BACKGROUND

Pushchairs with an adjustable child seat are known in the prior art. Such a pushchair comprises a frame and a seat coupled to the frame and comprising a seat part and a back part, which parts are pivotally connected to each other. The pushchair further comprises a tensioning device. This tensioning device comprises a first band which is coupled to the seat part, a pair of substantially inelastic bands which are each connected at a first end to a first end of the first band and connected at a second end to respective sides of the frame, and an adjusting device which is fixedly connected to the back part. The adjusting device comprises here a clamping member which can be operated by a user and which can be brought into a clamping state and into a free state, wherein in the clamping state the clamping member fixes at least one of the pair of inelastic bands relative to the back part and wherein in the free state the clamping member terminates this fixation.

When the child seat with a child therein has to be brought from a sitting position into a reclining position in the known pushchair, the user unlocks the locking. As a result of the own weight of the child the back part will pivot downward relative to the seat part. During the pivoting movement the user holds on to the back part with a hand so as to make the movement take place gradually.

As used herein, the reclining position is not limited to one single position of the back part, but a reclining position refers to a position of the back part wherein a child can typically adopt a reclining posture. In similar manner the sitting position is not limited to one single position of the back part, but a sitting position refers to a position of the back part wherein a child can typically adopt a sitting posture. In other words, a movement from the reclining position to the sitting position corresponds to an upward pivoting movement of the back part, and a movement from the sitting position to the reclining position corresponds to a downward pivoting movement. A plurality of intermediate positions is further possible. A continuously variable adjustment is more particularly possible.

When the child seat with a child therein has to be brought from the reclining position into the sitting position, the user will once again unlock the fixation. In this case the user will however need two hands in order to pivot the back part. The user operates the clamping member with one hand, wherein a pushing movement is performed with the same hand. As a result of the back part moving upward, the distance between the clamping member and the fastening points of the inelastic bands on the frame will decrease. The length of the piece of inelastic band between the clamping member and these fastening points will however not decrease automatically. In order to reduce this length the user has to pull downward on the first band using the other hand, while the user is simultaneously operating the clamping member with his or her other hand.

It has been found that the above stated operation for bringing the child seat from the reclining position into the sitting position may be deemed undesirable by the users.

SUMMARY

According to aspects of the invention the first band is an elastic band which, at least after termination of the fixation of the pair of inelastic bands by operation of the clamping member, exerts a tensile force on the inelastic bands, whereby these bands are tightened. In the pushchair according to aspects of the invention the inelastic bands will be placed under tension as a result of the elastic band during a movement from the reclining position to the sitting position, after the fixation is released. When a user now moves the back part upward with a hand, the length of the piece of inelastic band between the clamping member and the fastening points will automatically decrease.

The seat can comprise a plurality of panels pivotally connected to each other. The seat part and the back part can here each comprise a plurality of panels. It is also possible for the back part and the seat part to share a panel.

The seat part extends in a first direction from a foot end, which corresponds to the position of the feet when a child has taken a seat in the child seat in regular manner, toward the back part. The elastic band is preferably placed parallel to the first direction here.

It is further preferred for the inelastic bands to extend from the elastic band, via the clamping member and to the frame. The clamping member is thus always situated here between the frame and the connection between the elastic band and the inelastic bands.

The frame preferably comprises a wheel-bearing undercarriage and a pair of arms extending in parallel from the undercarriage, wherein the inelastic bands are each coupled to a different arm.

The arms extending from the undercarriage can each comprise a lower part and an upper part, which are pivotally coupled to each other. Each lower part can further be pivotally coupled to the undercarriage. The device can hereby be collapsed by first rotating the upper parts relative to the lower parts and then rotating the lower and upper parts together relative to the undercarriage. Each inelastic band can also be connected to an individual upper part.

The clamping member can comprise a first part and a second part which can move toward each other for the purpose of said clamping, as well as a spring for placing this movement under spring tension, which spring tension is configured to move the first and second part toward each other.

The first part can be provided with a structure for enabling the first part to be gripped with a hand in order to move the first part and second part apart. In addition to or instead of this the adjusting device can comprise a guide for guiding the inelastic bands from the elastic band to the frame.

At least one of the first and second part can comprise a toothed structure for engaging at least one inelastic band for the purpose of said fixing of the inelastic band relative to the back part.

A second end of the elastic band can be fixedly connected to the adjusting device, wherein the device further comprises a loop element, such as a ring, through which the elastic band is guided, connected to the seat part. In this solution a long elastic band can be used. In other solutions the second end is fixedly connected to the seat part without making use of a loop element.

The present invention likewise relates to a seat for a device for transporting a child. The seat is embodied here as described above.

BRIEF DESCRIPTION OF THE DRAWINGS

The present invention will be discussed in more detail hereinbelow with reference to the accompanying figures, in which.

DETAILED DESCRIPTION

Figure 1:
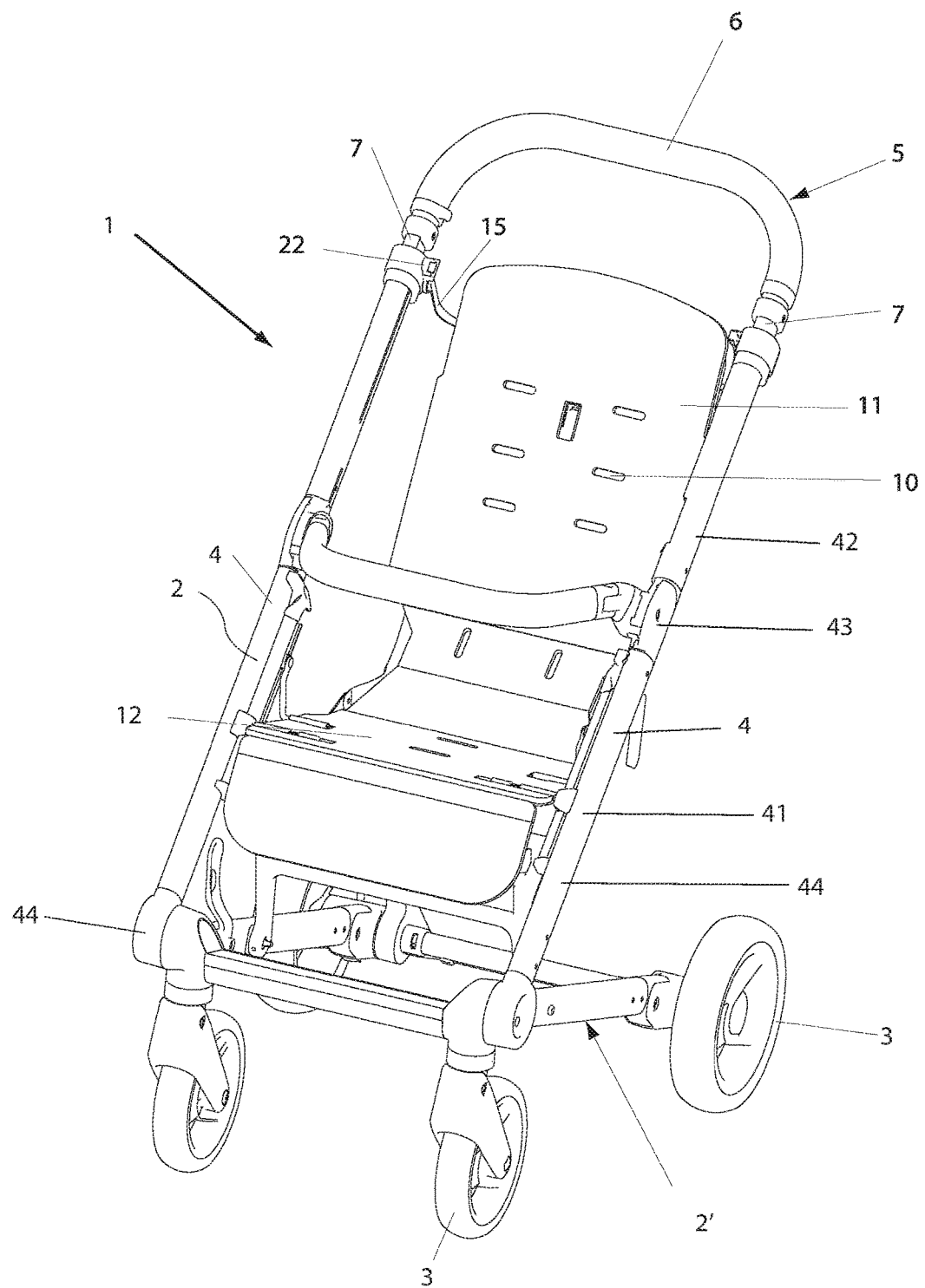
FIG. 1 shows a perspective view of an embodiment of a pushchair according to the present invention, wherein the child seat is placed in sitting position.

FIG. 1 shows a pushchair 1 with a frame 2 comprising an undercarriage 2'. Undercarriage 2' is coupled to four wheels 3. The invention however does not preclude the invention being applied in for instance buggies or other devices for transporting a child wherein three wheels are for instance used.

Extending in parallel and obliquely rearward from undercarriage 2' are two arms 4 which each comprise a lower part 41 and an upper part 42 which are pivotally connected to each other by means of a hinge 43. Undercarriage 2' comprises hinges 44 with which lower parts 41 are pivotally connected to undercarriage 2'. Pushchair 1 is hereby collapsible. In an embodiment pushchair 1 can be collapsed by first rotating upper parts 42 forward and then rotating lower and upper parts 41, 42 downward toward undercarriage 2'. The individual rotating movements stated here can be locked by means of known locking means (not shown). These locking means can be unlocked by operating known operating members (not shown). In an embodiment there is a separate locking for the rotation of upper part 42 toward lower part 41 and the rotation of lower and upper parts 41, 42 toward undercarriage 2'.

A telescopically movable pusher 5 is provided on the upper side of arms 4. Pusher 5 comprises here a central part 6 and a pair of pusher arms 7 which are at least partially slidably received in arms 4.

Figure 2:
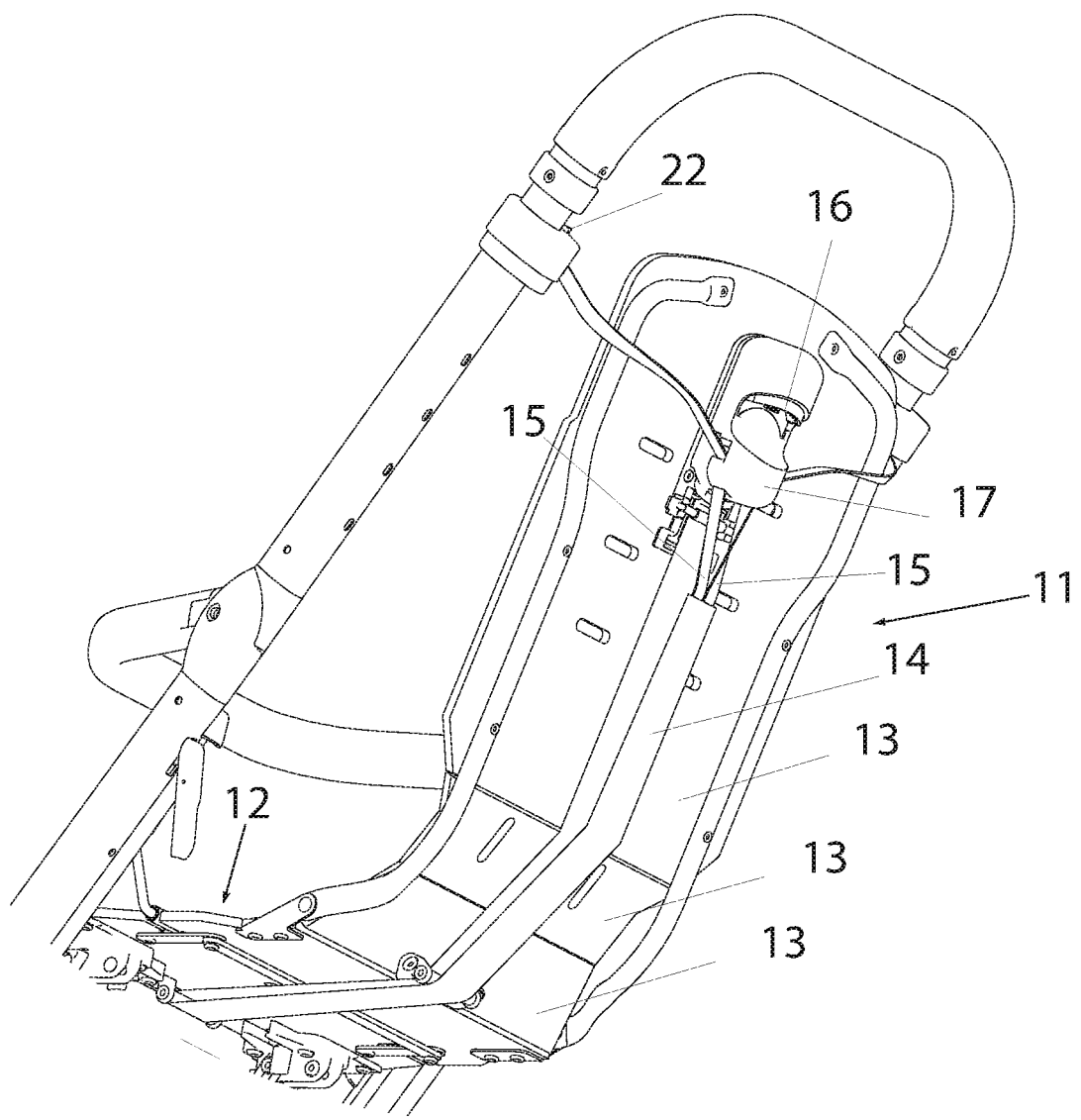
FIG. 2 shows a rear view of the pushchair of FIG. 1.

Pushchair 1 further comprises a seat 10 comprising a back part 11 and a seat part 12. As shown in FIG. 2, seat 10 comprises a plurality of panels 13 which are attached pivotally to each other. This can for instance be done by giving the connection between panels 13 a very thin form. This allows an integral manufacture of seat part 12 and back part 11, without the pivoting of these parts being obstructed.

Figure 4A:
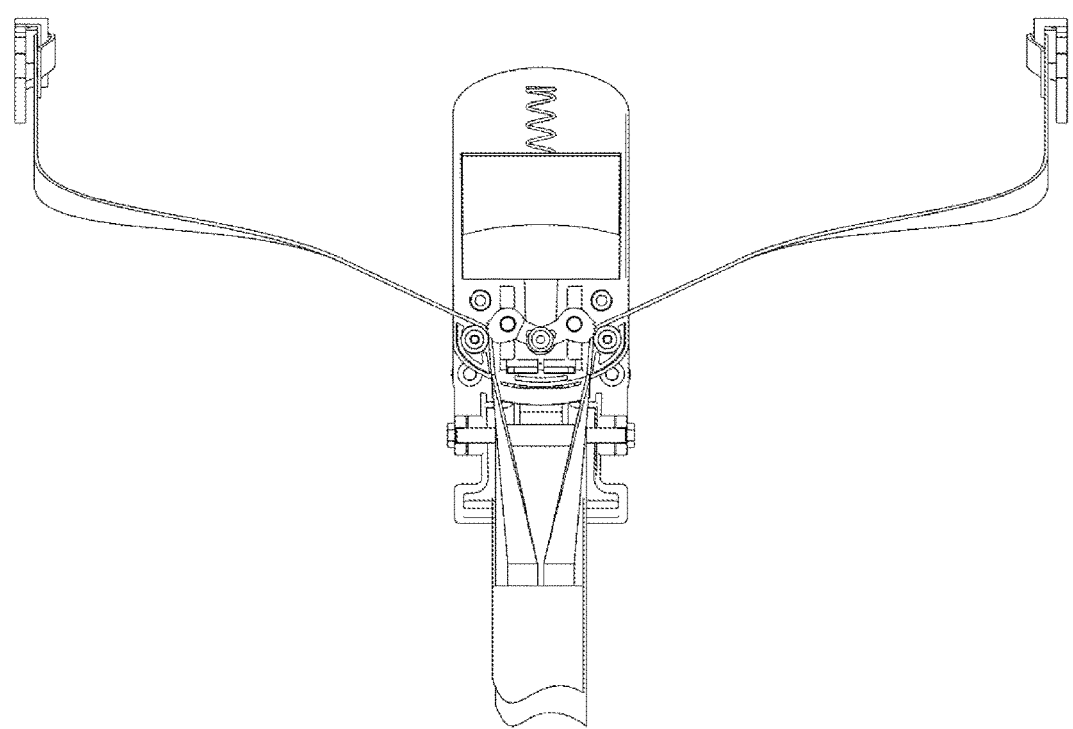
FIGS. 4A and 4B show respectively the adjusting device and a detail view thereof associated with the child seat of FIG. 1.

FIG. 2 shows an elastic band 14 which has been guided through a loop element 45 connected to seat part 12. Two inelastic bands 15 are connected to the one end of band 14, while the other end is fixedly connected to an adjusting device 16. Inelastic bands 15 extend from elastic band 14 toward adjusting device 16, which comprises a clamping member 17. This latter member comprises a first part 18 and a second part 19, see FIG. 4A and FIG. 4B. First part 18 comprises here a structure 20 such that this can be gripped by hand, so that first part 18 and second part 19 can be moved apart. Adjusting device 16 comprises a guide 21 for guiding inelastic bands 15 from the elastic band to points 22 where bands 15 are fastened to arms 42. First part 18 further comprises a toothed structure 23 for engaging at least one inelastic band 15 so that this is fixed relative to back part 11.

Figure 4B:
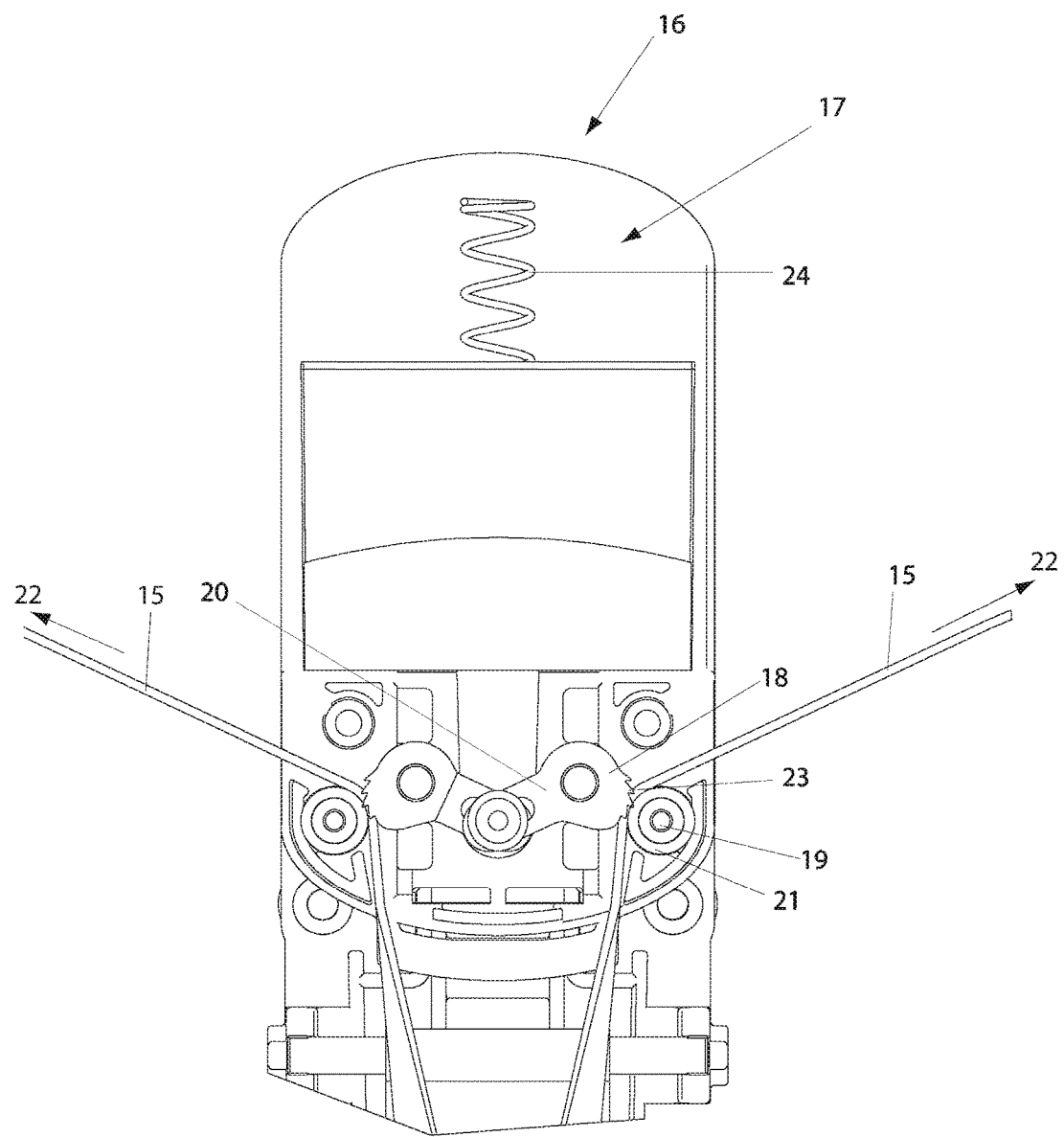

As shown in FIG. 4B, clamping member 17 comprises a spring 24 which provides for a spring tension such that first part 18 and second part 19 are pushed toward each other. This achieves that inelastic bands 15 are fixed without exertion of force by the user.

Figure 3:
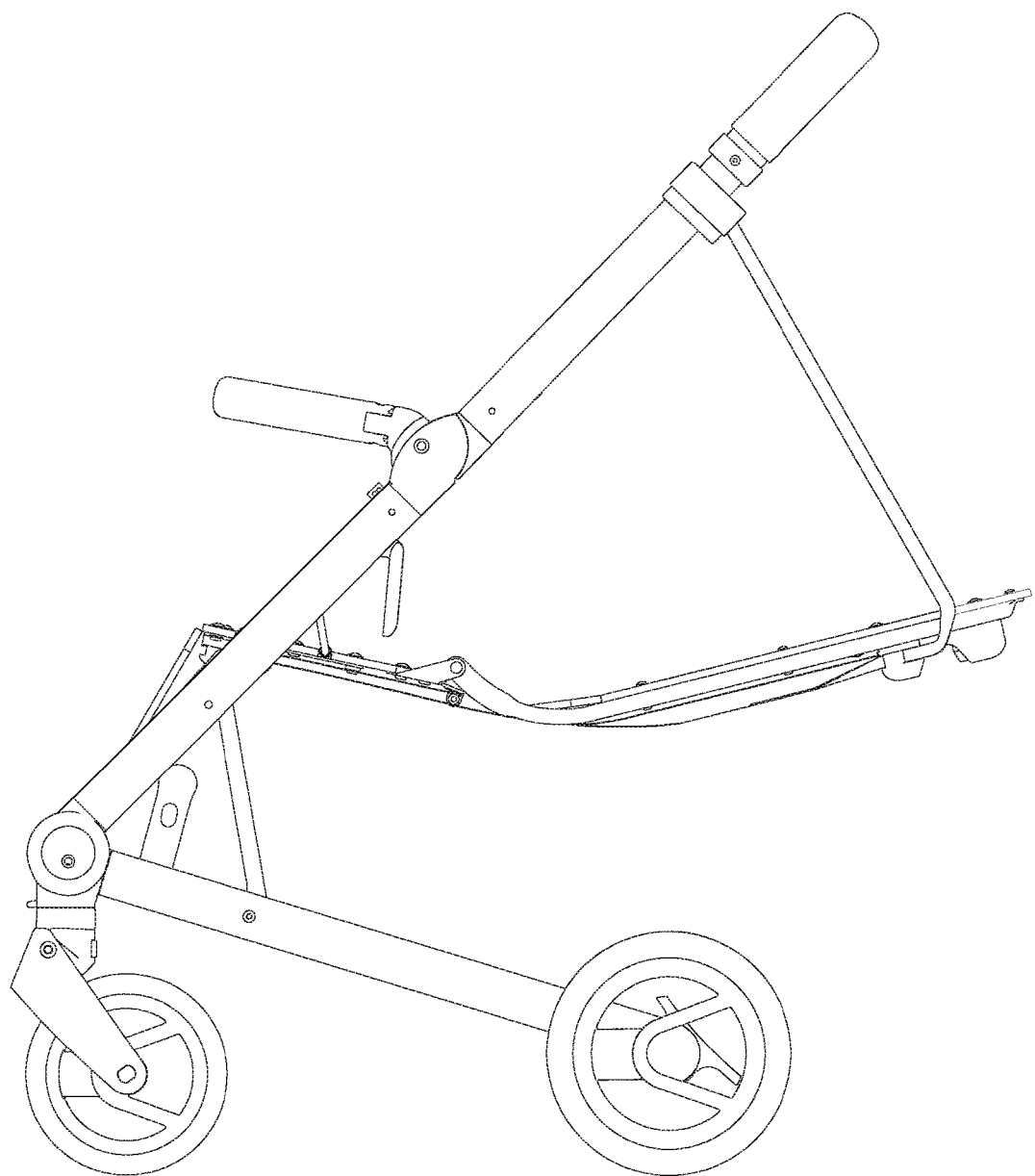
FIG. 3 shows the pushchair of FIG. 1 with the child seat in reclining position.

FIG. 1 shows the child seat in sitting position. FIG. 3 shows the same seat in reclining position. In order to move from the sitting position to the reclining position the user operates clamping member 17. Inelastic bands 15 will hereby no longer be fixed. When a child is present in the child seat, the weight of the child will cause back part 11 to pivot downward relative to seat part 12. The length of inelastic bands 15 which is situated between clamping member 17 and connecting points 22 will hereby increase. This is made possible in that elastic band 14 stretches counter to its own spring force.

When the child seat has to be brought from the reclining position into the sitting position, the user will once again operate clamping member 17. During the movement to the sitting position the length of inelastic bands 15 which is situated between clamping member 17 and connecting points 22 will have to decrease. If this is not the case, fixation of inelastic bands 15 will after all take place at the same position as in the reclining position when clamping member 17 is released. As a result, back part 11 will pivot downward in undesired manner.

The above stated decrease of the length of inelastic bands 15 which is situated between clamping member 17 and connecting points 22 is achieved according to the invention by the action of elastic band 14. This is because this is in stretched state and, as a result, will exert a tensile force on inelastic bands 15. Inelastic bands 15 will hereby move downward relative to clamping member 17.

As will be apparent from the above description, the present invention provides a solution with which a continuously variable adjustment of the child seat is realized in simple manner and with only one hand.

It will be apparent to the skilled person that various modifications are possible to the embodiments shown here without departing from the scope of protection of the present invention, which is defined by the appended claims.

The invention claimed is:

1. Device for transporting a child, comprising:
a frame;
a seat coupled to the frame and comprising:
  a seat part and a back part, which parts are pivotally connected to each other;
  a tensioning device comprising:
    a first band which is coupled to the seat part;
    a pair of substantially inelastic bands which are each connected at a first end to a first end of the first band and connected at a second end to respective sides of the frame;
    an adjusting device which is fixedly connected to the back part;
    wherein the adjusting device comprises a clamping member which can be operated by a user and which can be brought into a clamping state and into a free state, wherein in the clamping state the clamping member fixes at least one of the pair of inelastic bands relative to the back part and wherein in the free state the clamping member terminates this fixation;

wherein the first band is an elastic band which, at least after termination of the fixation of the pair of inelastic bands by operation of the clamping member, exerts a tensile force on the inelastic bands to tighten the inelastic bands.

2. Device according to claim 1, wherein the seat comprises a plurality of panels pivotally connected to each other.

3. Device according to claim 1, wherein the seat part extends in a first direction from a foot end toward the back part, wherein the elastic band is placed parallel to the first direction.

4. Device according to claim 1, wherein the inelastic bands extend from the elastic band, via the clamping member and to the frame.

5. Device according to claim 1, wherein the frame comprises a wheel-bearing undercarriage and a pair of arms extending in parallel from the undercarriage, wherein the inelastic bands are each coupled to a different arm.

6. Device according to claim 5, wherein the arms extending from the undercarriage each comprise a lower part and an upper part, which are pivotally coupled to each other.

7. Device according to claim 6, wherein each lower part is pivotally coupled to the undercarriage.

8. Device according to claim 6 or 7, wherein each inelastic band is connected to an individual upper part.

9. Device according to claim 1, wherein the clamping member comprises a first part and a second part and a spring, wherein the spring provides spring tension to move the first and second part toward each other.

10. Device according to claim 9, wherein the first part comprises a structure for enabling the first part to be gripped with a hand in order to move the first part and second part apart.

11. Device according to claim 9, wherein the second part comprises a guide for guiding the inelastic bands from the elastic band to the frame.

12. Device according to claim 9, wherein at least one of the first and second part comprises a toothed structure for engaging at least one inelastic band to fix the inelastic band relative to the back part.

13. Device according to claim 1, wherein a second end of the elastic band is fixedly connected to the adjusting device, the device further comprising a loop element, such as a ring, through which the elastic band is guided, connected to the seat part.

14. Device according to claim 1, wherein the device comprises a pushchair or a buggy.

15. Seat for a device for transporting a child, which device comprises a frame to which the seat can be coupled, wherein the seat comprises:
   a seat part and a back part, which parts are pivotally connected to each other;
   a tensioning device comprising:
      a first band which is coupled to the seat part;
      a pair of substantially inelastic bands which are each connected at a first end to a first end of the first band and connected at a second end to respective sides of the frame;
      an adjusting device which is fixedly connected to the back part;
      wherein the adjusting device comprises a clamping member which can be operated by a user and which can be brought into a clamping state and into a free state, wherein in the clamping state the clamping member fixes at least one of the pair of inelastic bands relative to the back part and wherein in the free state the clamping member terminates this fixation;
   wherein the first band is an elastic band which, at least after termination of the fixation of the pair of inelastic bands by operation of the clamping member, exerts a tensile force on the inelastic bands to tighten the inelastic bands.

* * * * *